United States Patent [19]
Leonard

[11] 3,890,875
[45] June 24, 1975

[54] OCTAVE LOCATOR FOR KEYBOARD AND NOTE READING

[76] Inventor: Verna M. Leonard, 8701 Highway 41, Fresno, Calif. 93710

[22] Filed: July 24, 1974

[21] Appl. No.: 491,258

[52] U.S. Cl. .................... 84/471; 84/483; 84/485
[51] Int. Cl. .......................................... G09b 15/02
[58] Field of Search ......................... 84/470–475, 84/477 R, 483, 485

[56] References Cited
UNITED STATES PATENTS

| | | | |
|---|---|---|---|
| 2,542,235 | 2/1951 | Clopton | 84/474 |
| 2,649,008 | 8/1953 | Bova et al. | 84/474 |
| 3,129,628 | 4/1964 | Hall | 84/471 |

FOREIGN PATENTS OR APPLICATIONS

| | | | |
|---|---|---|---|
| 39,349 | 7/1924 | Norway | 84/473 |

Primary Examiner—Joseph W. Hartary
Assistant Examiner—John F. Gonzales
Attorney, Agent, or Firm—Ralph S. Branscomb

[57] ABSTRACT

The invention is an aid for teaching the position of notes on a staff in relation to the position of the corresponding keys on the keyboard. A rotatable dial permits the user to select any octave from the periphery of the dial and indicators on the dial direct the user to spaced locations on a musical staff where the notes of a diatonic scale in the selected octave are written. A substantial portion of a keyboard which is divided into numbered octaves is represented beneath the dial to indicate the general area of the keyboard in which the user is working.

6 Claims, 4 Drawing Figures

OCTAVE LOCATOR FOR KEYBOARD AND NOTE READING

BACKGROUND OF THE INVENTION

Every music student must learn that any particular scale tone in music is represented in every octave and is played on a different key in the keyboard and is represented by a different note on the musical staff for every octave. The concept is not difficult but learning the staff position of each note and the corresponding keyboard location, as well as acquiring an overall perspective of the entire keyboard and the double staff structure requires considerable time and practice.

SUMMARY OF THE INVENTION

The present invention breaks both the staff and the keyboard down into single-octave quanta so that the student can make the note reading-keyboard association on an octave-by-octave basis as well as on an individual scale tone basis, and at the same time provides the student with an overview of the entire keyboard.

Structurally the device comprises an envelope with a rotatable dial mounted to the rear side of the envelope front, the dial having peripheral sectors indentified with the octaves of the keyboard, each of the sectors being individually exposable through a cutaway portion of the envelope front. A sheet is insertable in the envelope such that half of it extends outside the envelope, and preferably the top and bottom of the sheet are provided with numbered musical staffs, the bottom staffs being upside down with respect to the top staffs so that the sheet is reversible. The student rotates the dial to select an octave, writes the notes of a diatonic scale on the appropriately numbered staff and repeats the process for all octaves. A piano keyboard divided into numbered octaves is displayed on the envelope front.

DETAILED DESCRIPTION OF THE PREFERRED EMBODIMENT

Figure 1:
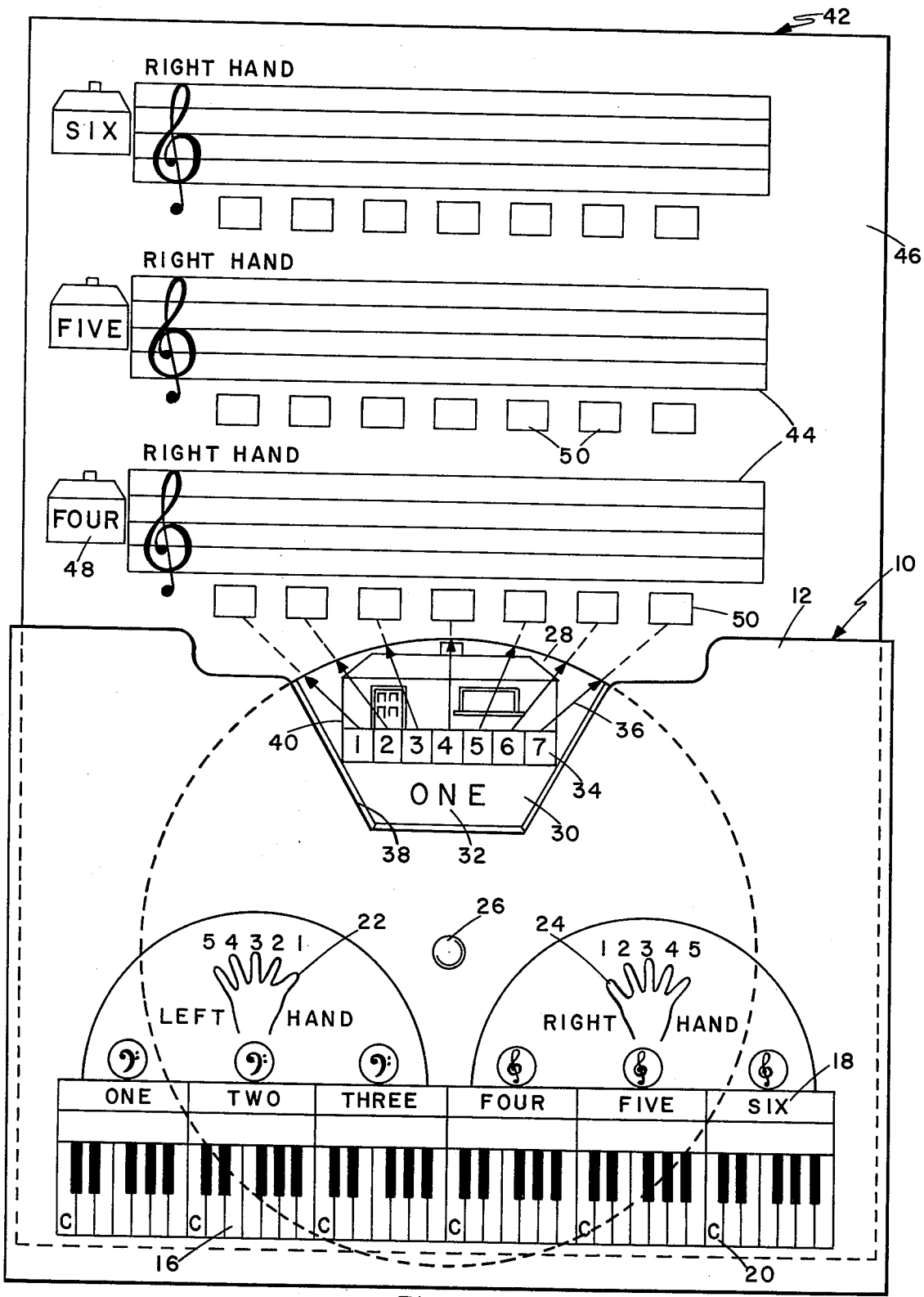
FIG. 1 is a front elevation view of the invention with the concealed portions shown in dashed line.
Figure 2:
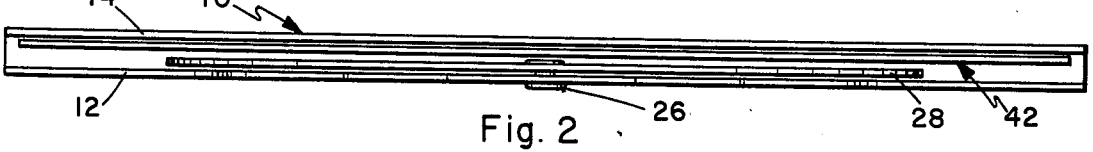
FIG. 2 is a view of the invention looking down on FIG. 1.

The device comprises an envelope 10 having a front panel 12 and a rear panel 14 which may be simply made by folding a stiff piece of paper with or without joining the side edges. On the lower part of the front panel 12 is a representation of a portion of a piano keyboard 16 which is divided into octaves which are numbered at 20. Although the entire keyboard could be shown, it is desireable that the unit be keyed to a particular key signature and the first key of each octave be the root of the key signature, as indicated by the letter "C" at 20. If the entire keyboard were used, fragmented octaves would appear at each end of the representation in all keys but one, so only six octaves are shown. Additionally, six octaves provides an equal number of treble and bass octaves.

Immediately above the keyboard are two arrays of indicia 22 and 24 representing the left hand and right hand respectively above the octaves which they are used to play. The appropriate clef sign may also be shown over the individual octaves as illustrated in FIG. 1.

Rotatably mounted by a rivet 26 to the rear of the front panel 12 is a circular dial 28 which is divided into a number of sectors 30 which is equal to the number of octaves in the keyboard 16. Each of the sectors is numbered at 32 to indicate to which octave it relates, and preferably a row of numbers 34 from one to seven is provided, each of the numbers having an associated outwardly-radiating arrow 36 for a purpose made clear hereinafter. An upper portion of the front panel 12 is cut away to form a window 38 shaped to conform to the contours of an individual sector 30 so that the dial can be rotated to select any specific sector desired. Inasmuch as the unit is intended for use primarily for children, fanciful background designs such as the houses 40 may be used on each of the sectors to stimulate interest.

The structure described thus far is intended to be used with sheets of staff paper which are preferably of the special form shown, although of course other types could be used. A sheet of the preferred type is illustrated at 42 and has three staffs 44 disposed on the first half 46 such that all three are visible when the second half (lower half in FIG. 1) is inserted in the envelope. The staffs 44 relate to the upper three octaves of the illustrated keyboard and are correspondingly numbered at 48 and each is provided with a treble clef. A row of seven evenly spaced writing squares 50 is displayed below each staff, the row immediately above the dial aligned with the arrows 36 on the exposed dial sector. The staffs may have indicated thereabove which of the hands is normally used to finger the keys in the associated octaves, as shown.

Figure 3:
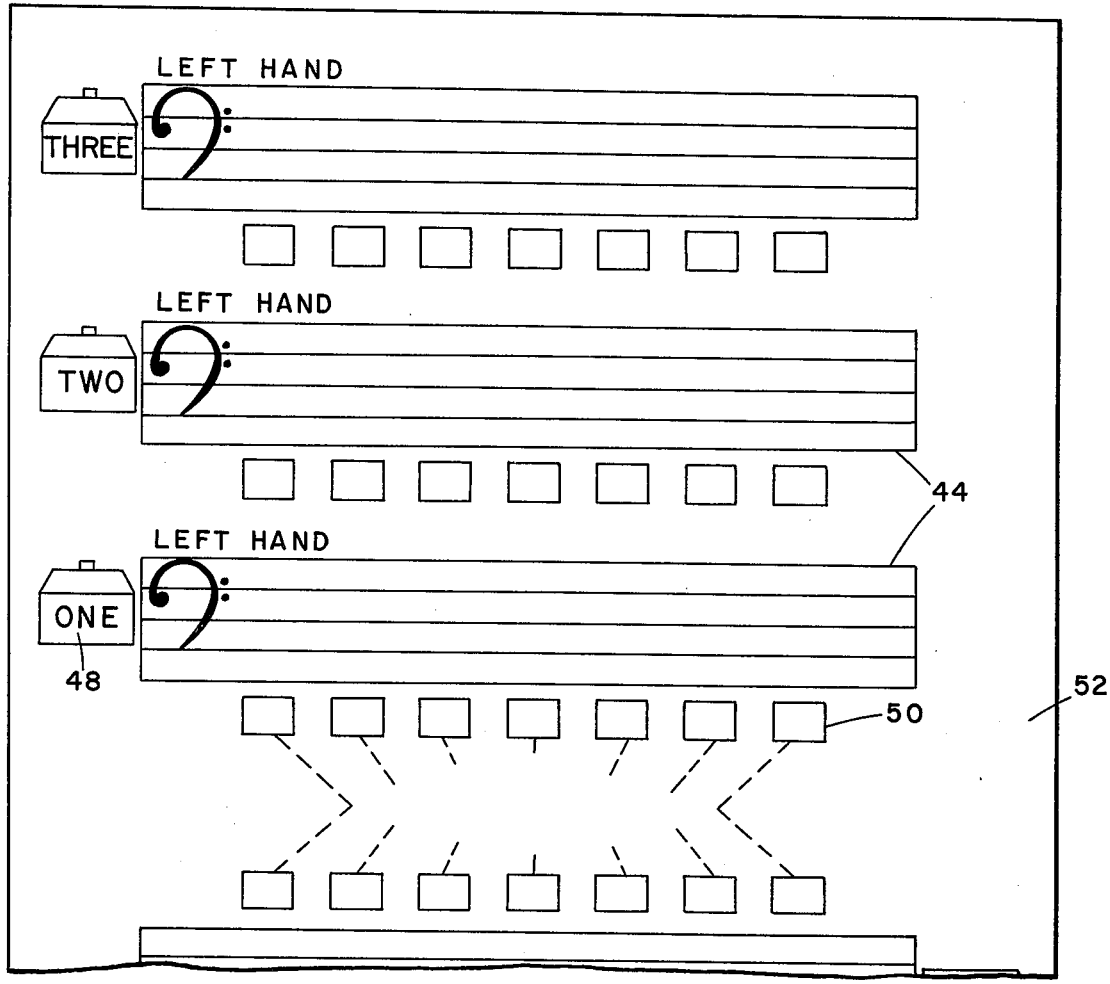
FIG. 3 illustrates the lower portion of the insert sheet of FIG. 1 upside down.
Figure 4:
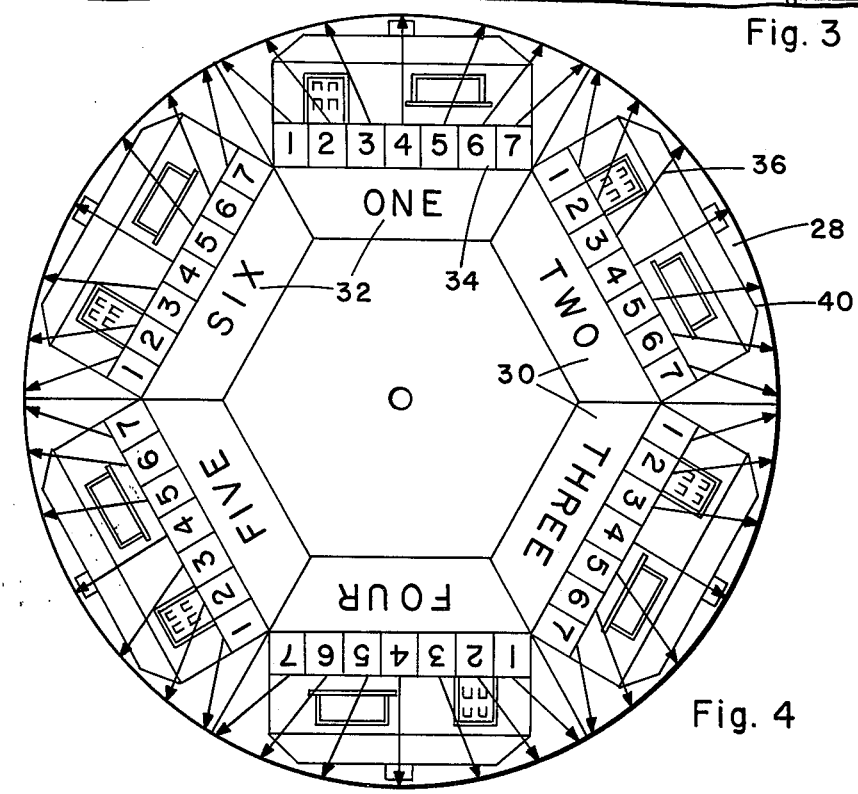
FIG. 4 is a front elevation view of the dial of FIG. 1 removed from the remaining structure.

The second half of the staff paper 52 which is the lower, hidden half in FIG. 1, is shown in full in FIG. 3. The staff display on the second half is identical to that already described except that the staffs are associated with the base octaves and the left hand, and are upside-down on the sheet relative to the former staffs for obvious reasons.

In the proposed operation of the invention, the user inserts a sheet of staff paper into the envelope, turns the dial to the "ONE" position and proceeds to inscribe the seven scale tone names of the diatonic "C" scale in the squares 50 below the number one staff, taking the order indicated by the number 34. He then writes in the notes representing the scale tones, in the first octave, on the staff. He may then play a few notes from the first octave on a piano, and after digesting the note positions on the keyboard, and the associated notes he has written on the staff, he repeats the process for the remaining bass octaves, removes the staff paper and goes through the treble octaves.

The procedure may be repeated and varied by inserting chords, or even tunes, on the disposable staff paper until the student becomes thoroughly familiar with the octave structure of the keyboard and the positions of the notes on the staff which fall into the various octaves. By slightly varying the keyboard representation so that the octave divisions fall in different places, other units can be made relating to key signatures other than "C" to thoroughly drill the student in all key signatures covering all the keys of the piano.

I claim:

1. A music teaching aid comprising:

a. an envelope having a front panel and a rear panel;
b. said front panel having a representation thereon of a piano keyboard divided into numbered octaves;
c. a dial rotatably mounted to the rear surface of said front panel and having a plurality of peripheral sectors provided in the same quantity as said numbered octaves and being numbered to individually correspond therewith;
d. said front panel having a portion cut away to expose any selected one of said sectors;
e. an insert sheet insertable into said envelope and being of height dimension to have a first portion extending from said envelope when a second portion is fully inserted on said envelope and having at least one musical staff on said first portion, whereby the user can rotate the dial to select a particular numbered sector and inscribe notes contained in the corresponding octave on said staff.

2. Structure according to claim 1 wherein each of said sectors is provided with a row of numbers from one through seven to correspond to the notes in a diatonic scale, and each of said numbers is provided with an arrow indicating a separate portion of said staff, whereby the user is directed to inscribe the notes of a diatonic scale on the indicated portions of said staff.

3. Structure according to claim 2 wherein a row of seven defined writing spaces is provided beneath each staff for the inscription of seven scale tone names of a diatonic scale corresponding to notes written on the staff.

4. Structure according to claim 1, and including a plurality of staffs on the first portion of said sheet, each of said staffs being numbered to correspond with separated ones of said octaves and being provided with the particular clef sign of the octave numbered.

5. Structure according to claim 4 wherein the second portion of said sheet is provided with a plurality of numbered staffs which are upside-down with respect to the staffs on said first portion, whereby the first portion is insertable in said pocket to permit inscription of notes on the staffs of said second portion.

6. Structure according to claim 1 and including indicia disposed on said front panel above said keyboard representation, said indicia including a left hand over the bass octaves of the keyboard and a right hand over the treble octaves of the keyboard, the fingers of each hand being numbered in order from one to five beginning with the thumb to facilitate teaching the student proper fingering of a keyboard.

* * * * *